United States Patent
Esashi et al.

(10) Patent No.: US 7,405,506 B2
(45) Date of Patent: Jul. 29, 2008

(54) DRIVING MECHANISM AND MICRO-MIRROR DEVICE PROVIDED WITH THE SAME

(75) Inventors: Masayoshi Esashi, Miyagi-ken (JP); Naoki Kikuchi, Tokyo (JP); Rogerio Jun Mizuno, Saitama-ken (JP); Masanori Maeda, Saitama-ken (JP); Satoshi Karasawa, Saitama-ken (JP)

(73) Assignees: Tohoku University, Miyagi (JP); Hoya Corporation, Tokyo (JP)

( * ) Notice: Subject to any disclaimer, the term of this patent is extended or adjusted under 35 U.S.C. 154(b) by 533 days.

(21) Appl. No.: 11/201,316

(22) Filed: Aug. 11, 2005

(65) Prior Publication Data

US 2006/0033389 A1  Feb. 16, 2006

(30) Foreign Application Priority Data

Aug. 12, 2004  (JP) .............................. 2004-235492

(51) Int. Cl.
 *H02N 1/00* (2006.01)
 *G02B 26/08* (2006.01)
(52) U.S. Cl. .................. 310/309; 359/225; 359/291
(58) Field of Classification Search ................. 310/309; 359/223–226, 290, 291, 872
 See application file for complete search history.

(56) References Cited

U.S. PATENT DOCUMENTS

| | | | | |
|---|---|---|---|---|
| 4,730,200 | A | 3/1988 | Kitazawa | 354/152 |
| 5,959,760 | A * | 9/1999 | Yamada et al. | 359/224 |
| 6,713,367 | B2 * | 3/2004 | Solgaard et al. | 438/459 |
| 6,744,173 | B2 * | 6/2004 | Behin et al. | 310/309 |
| 6,753,638 | B2 * | 6/2004 | Adams et al. | 310/309 |
| 7,079,299 | B1 * | 7/2006 | Conant et al. | 359/224 |
| 7,130,099 | B2 * | 10/2006 | Tsuboi et al. | 359/226 |
| 7,161,274 | B2 * | 1/2007 | Tsuboi et al. | 310/309 |
| 7,242,511 | B2 * | 7/2007 | Ko et al. | 359/291 |
| 2003/0156315 | A1 * | 8/2003 | Li et al. | 359/290 |

(Continued)

FOREIGN PATENT DOCUMENTS

JP  5-076186  3/1993

(Continued)

OTHER PUBLICATIONS

English Language Abstract of JP 5-076186.

(Continued)

*Primary Examiner*—Karl I Tamai
(74) *Attorney, Agent, or Firm*—Greenblum & Bernstein, P.L.C.

(57) ABSTRACT

A driving mechanism configured to turn a plate member with respect to a frame member around a predetermined turning axis includes a pair of supporting members supporting the plate member, a pair of actuators provided on both sides with respect to the turning axis and on the same surface side of the plate member. Each of the actuators includes a fixed electrode unit fixed to the frame member and a movable electrode unit fixed to the plate member. The fixed electrode unit includes a substrate, a pair of fixed comb electrodes provided on both surface sides of the substrate. The movable electrode unit includes a pair of movable comb electrodes, each of which engages with the corresponding fixed comb electrode with a gap therebetween. Both pairs of the fixed comb electrode and the corresponding movable comb electrode are configured such that a voltage can be applied therebetween independently.

20 Claims, 4 Drawing Sheets

U.S. PATENT DOCUMENTS

2006/0018049 A1* 1/2006 Mizuno ..................... 359/871
2006/0033389 A1* 2/2006 Esashi et al. ............. 310/75 R

FOREIGN PATENT DOCUMENTS

JP  2000-147419  5/2000
JP  2003-029172  1/2003

OTHER PUBLICATIONS

English Language Abstract of JP 2000-147419.
English Language Abstract of JP 2003-029172.
U.S. Appl. No. 11/187,984, filed Jul. 25, 2005.

* cited by examiner

DRIVING MECHANISM AND MICRO-MIRROR DEVICE PROVIDED WITH THE SAME

BACKGROUND OF THE INVENTION

The present invention relates to a micro-mirror device that is configured to scan light and a driving mechanism that is incorporated in the micro-mirror device.

Conventionally, an electrostatic capacity type micro-mirror (hereinafter, simply referred to as a micro-mirror) is used in various technological fields such as an optical switch for telecommunication, a measuring instrument, and a scanner. The micro-mirror device is provided with a driving mechanism that is located on the opposite side of a mirror surface scanning incident light. The mirror-device is designed such that the mirror surface is tilted by electrostatic attractive force which is generated by applying voltage to the driving mechanism. Recently, the micro-mirror device is required to be more downsized while generating greater electrostatic attractive force for tilting the mirror surface. An example of a micro-mirror device that meets such requirements is disclosed in Japanese Patent Provisional Publications No. P2000-147419.

A micro-mirror device disclosed in this publication (JP P2000-147419) is provided with movable comb electrodes and fixed comb electrodes on the opposite side of a mirror surface, which engage with each other. To be more concrete, there are provided two pairs of a movable comb electrode and a fixed comb electrode that face each other across a turning axis on the opposite side of the mirror surface. The structure of the device disclosed in this publication enables to downsize the entire device.

However, if a micro-mirror device is designed as disclosed in this publication (JP P2000-14179), there is a problem that a mirror surface may be translated in a vertical direction (a direction perpendicular to the mirror surface) by electrostatic attractive force generated by a bias voltage that is previously applied to fixed electrodes. If the mirror surface is translated, misalignment of a light incident point on the mirror surface will occur. Such misalignment results in a problem that light incident on the mirror surface scans an area out of a predetermined scanning area Further, the translation of the mirror surface could cause a so-called pull-in phenomenon and/or a phenomenon in which undue stress is applied to a hinge that rotatable supports the mirror, thereby damaging inside the device.

SUMMARY OF THE INVENTION

The present invention is advantageous in that a driving mechanism and a micro-mirror device having the driving mechanism are provided that enable downsizing of the entire device and reducing of stress which is applied to components of the device such as a hinge.

According to an aspect of the invention, there is provided a driving mechanism for turning a turnable plate member, with respect to a first frame member, around a predetermined first turning axis, including a first pair of supporting members that rotatably supports the plate member with respect to the first frame member, the first pair of supporting members being aligned along the predetermined first turning axis, a first actuator and a second actuator provided on both sides with respect to the first turning axis and on the same surface side of the plate member. Each of the actuators includes a fixed electrode unit fixed to the first frame member and a movable electrode unit fixed to the plate member. The fixed electrode unit includes a substrate which is substantially parallel with the plate member located at a predetermined rotational position, a first fixed comb electrode provided on one surface side of the substrate, and a second fixed comb electrode provided on an opposite surface side of the substrate. The movable electrode unit includes a first movable comb electrode that engages with the first fixed comb electrode with a gap therebetween, and a second movable comb electrode that engages with the second fixed comb electrode with a gap therebetween. The first fixed comb electrode and the first movable comb electrode, and the second fixed comb electrode and the second movable comb electrode are configured such that a voltage can be applied therebetween independently. When the plate member is rotated, a voltage is applied one of between the first fixed comb electrode and the first movable comb electrode and between the second fixed comb electrode and the second movable comb electrode of the first actuator and the other of between the first fixed comb electrode and the first movable comb electrode and between the second fixed comb electrode and the second movable comb electrode of the second actuator.

Optionally, the first fixed comb electrode and the second fixed comb electrode may be electrically insulated from one another.

Further optionally, the first actuator and the second actuator may be arranged along a direction substantially perpendicular to the first turning axis.

Furthermore, an opposite surface side of the plate member to the surface side on which the first actuator and the second actuator are provided may be a mirror surface.

Optionally, each supporting member of the first pair of supporting members may be a torsion bar.

Optionally, the driving mechanism, which is capable of turning the first frame member, with respect to a second frame member, around a predetermined second turning axis, may further include a second pair of supporting members that rotatably supports the first frame member with respect to the second frame member, the second pair of supporting members being aligned along the predetermined second turning axis, and a third actuator and a fourth actuator provided on both sides with respect to the second turning axis and on the same side as both of the first actuator and the second actuator with respect to the plate member.

Yet optionally, the second turning axis may be perpendicular to the first turning axis.

According to another aspect of the invention, there is provided a driving mechanism for turning a turnable plate member, with respect to a first frame member, around a predetermined first turning axis, includes a first pair of supporting members that rotatably supports the plate member with respect to the first frame member, the first pair of supporting members being aligned along the predetermined first turning axis, a first actuator and a second actuator provided on both sides with respect to the first turning axis and on the same surface side of the plate member. Each of the actuators includes a fixed electrode unit fixed to the first frame member and a movable electrode unit fixed to the plate member. The movable electrode unit includes a substrate which is substantially parallel with the plate member located at a predetermined rotational position, a first movable comb electrode provided on one surface side of the substrate, and a second movable comb electrode provided on an opposite surface side of the substrate. The fixed electrode unit includes a first fixed comb electrode that engages with the first movable comb electrode with a gap therebetween, and a second fixed comb electrode that engages with the second movable comb electrode with a gap therebetween. The first fixed comb electrode and the first movable comb electrode, and the second fixed comb electrode and the second movable comb electrode are configured such that a voltage can be applied therebetween independently. When the plate member is rotated, a voltage is applied one of between the first fixed comb electrode and the first movable comb electrode and between the second fixed comb electrode and the second movable comb electrode of the first actuator and the other of between the first fixed comb electrode and the first movable comb electrode and between the second fixed comb electrode and the second movable comb electrode of the second actuator.

According to a further aspect of the invention, there is provided a driving mechanism for turning a turnable plate member, with respect to a first frame member around a predetermined first turning axis, with respect to a second frame member around a predetermined second turning axis, including a first pair of supporting members that rotatably supports the plate member with respect to the first frame member, the first pair of supporting members being aligned along the predetermined first turning axis, a second pair of supporting members that rotatably supports the first frame member with respect to the second frame member, the second pair of supporting members being aligned along the predetermined second turning axis, a first actuator and a second actuator provided on both sides with respect to the first turning axis and on the same surface side of the plate member. Each of the first actuator and the second actuator includes a first fixed electrode unit fixed to the first frame member and a first movable electrode unit fixed to the plate member, a third actuator and a fourth actuator provided on both sides with respect to the second turning axis and on the same side as both of the first actuator and the second actuator with respect to the plate member. Each of the third actuator and the fourth actuator includes a second fixed electrode unit fixed to the second frame member and a second movable electrode unit fixed to the first frame member. Each of the first fixed electrode unit and the second fixed electrode unit includes a substrate which is substantially parallel with the plate member located at a predetermined rotational position, a first fixed comb electrode provided on one surface side of the substrate, and a second fixed comb electrode provided on an opposite surface side of the substrate. Each of the first movable electrode unit and the second movable electrode unit includes a first movable comb electrode that engages with the first fixed comb electrode with a gap therebetween, and a second movable comb electrode that engages with the second fixed comb electrode with a gap therebetween. The first fixed comb electrode and the first movable comb electrode, and the second fixed comb electrode and the second movable comb electrode are configured such that a voltage can be applied therebetween independently. When the plate member is rotated around the first turning axis, a voltage is applied one of between the first fixed comb electrode and the first movable comb electrode and between the second fixed comb electrode and the second movable comb electrode of the first actuator and the other of between the first fixed comb electrode and the first movable comb electrode and between the second fixed comb electrode and the second movable comb electrode of the second actuator When the plate member is rotated around the second turning axis, a voltage is applied one of between the first fixed comb electrode and the first movable comb electrode and between the second fixed comb electrode and the second movable comb electrode of the third actuator and the other of between the first fixed comb electrode and the first movable comb electrode and between the second fixed comb electrode and the second movable comb electrode of the fourth actuator.

According to a further aspect of the invention, there is provided a driving mechanism for turning a turnable plate member, with respect to a first frame member around a predetermined first turning axis, with respect to a second frame member around a predetermined second turning axis, including a first pair of supporting members that rotatably supports the plate member with respect to the first frame member, the first pair of supporting members being aligned along the predetermined first turning axis, a second pair of supporting members that rotatably supports the first frame member with respect to the second frame member, the second pair of supporting members being aligned along the predetermined second turning axis, a first actuator and a second actuator provided on both sides with respect to the first turning axis and on the same surface side of the plate member, each of the first actuator and the second actuator including a first fixed electrode unit fixed to the first frame member and a first movable electrode unit fixed to the plate member, a third actuator and a fourth actuator provided on both sides with respect to the second turning axis and on the same side as both of the first actuator and the second actuator with respect to the plate member. Each of the third actuator and the fourth actuator includes a second fixed electrode unit fixed to the second frame member and a second movable electrode unit fixed to the first frame member. Each of the first movable electrode unit and the second movable electrode unit includes a substrate which is substantially parallel with the plate member located at a predetermined rotational position, a first movable comb electrode provided on one surface side of the substrate, and a second movable comb electrode provided on an opposite surface side of the substrate. Each of the first fixed electrode unit and the second fixed electrode unit includes a first fixed comb electrode that engages with the first movable comb electrode with a gap therebetween, and a second fixed comb electrode that engages with the second movable comb electrode with a gap therebetween. The first fixed comb electrode and the first movable comb electrode, and the second fixed comb electrode and the second movable comb electrode are configured such that a voltage can be applied therebetween independently. When the plate member is rotated around the first turning axis, a voltage is applied one of between the first fixed comb electrode and the first movable comb electrode and between the second fixed comb electrode and the second movable comb electrode of the first actuator and the other of between the first fixed comb electrode and the first movable comb electrode and between the second fixed comb electrode and the second movable comb electrode of the second actuator. When the plate member is rotated around the second turning axis, a voltage is applied one of between the first fixed comb electrode and the first movable comb electrode and between the second fixed comb electrode and the second movable comb electrode of the third actuator and the other of between the first fixed comb electrode and the first movable comb electrode and between the second fixed comb electrode and the second movable comb electrode of the fourth actuator.

DETAILED DESCRIPTION OF THE EMBODIMENTS

Hereinafter, a driving mechanism and a micro-mirror device according to an embodiment of the present invention will be described with reference to the accompanying drawings. In addition, in each of constitution members of the micro-mirror device described below, the same side (surface) as a mirror surface on which light is incident is referred to as an upper side (surface), and an opposite side (surface) of the mirror surface is referred to as a lower side (surface).

Figure 1:
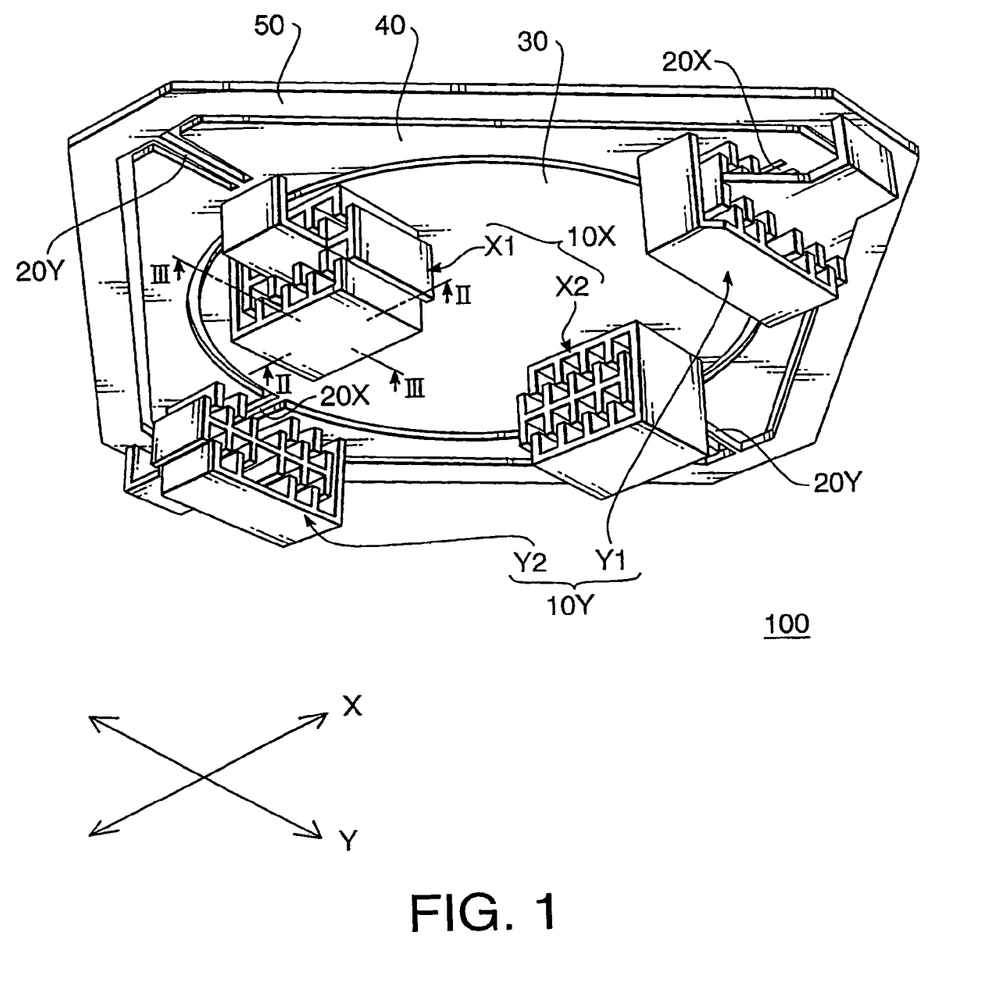
FIG. 1 is a perspective view of a micro-mirror device provided with a driving mechanism according to an embodiment of the present invention when viewed from the backside of a mirror surface of the micro-mirror device.

FIG. 1 is a perspective view of a micro-mirror device provided with a driving mechanism according to an embodiment of the invention when viewed from a lower side.

Figure 2:
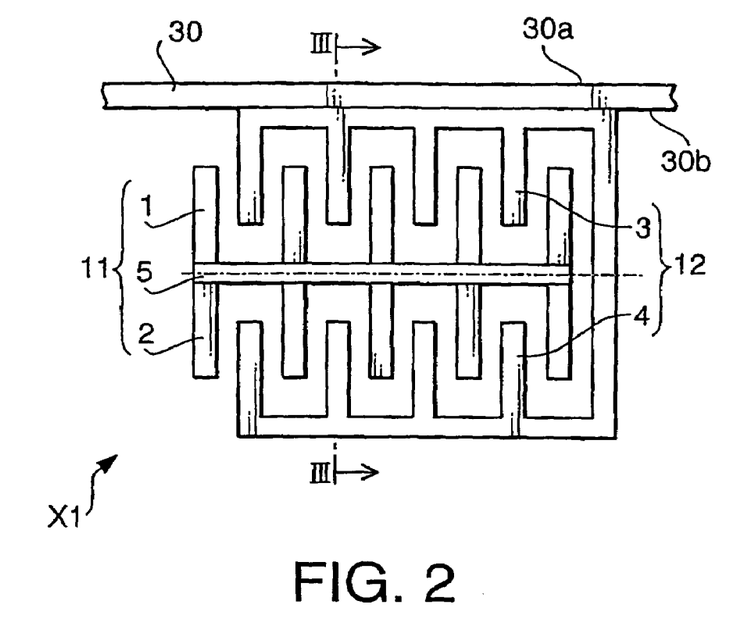
FIG. 2 is a section view of an actuator according to the embodiment of the invention with respect to a II-II section line shown in FIG. 1.
Figure 3:
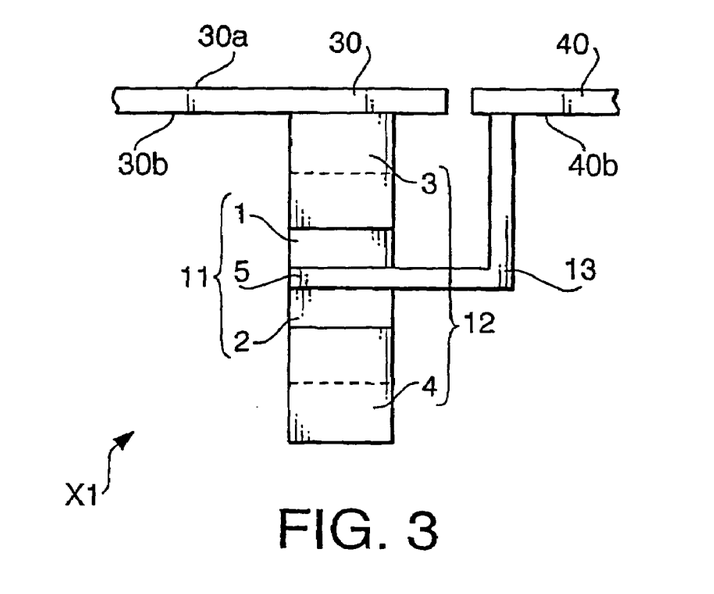
FIG. 3 is a section view of the actuator according to the embodiment of the invention with respect to a III-III section line shown in FIG. 1.

The micro-mirror device is provided with a mirror portion 30, a first frame 40, a second frame 50, a driving mechanism for turning the mirror portion 30 around an X axis 10X, a driving mechanism for turning the mirror portion 30 around a Y axis 10Y, The mirror portion 30 is formed such that an upper surface (that is, an opposite surface of the mirror portion 30 shown in FIG. 1, see FIGS. 2, 3) is a mirror surface 30a. The mirror portion 30 is supported by the first frame 40 through a pair of linearly-formed hinges 20X which are provided along the X axis. The first frame 40 is supported by the second frame 50 through a pair of linearly-formed hinges 20Y which are provided along the Y axis perpendicular to the X axis.

In the micro-mirror device 100, by driving the driving mechanism for turning the mirror portion 30 around the X axis 10X, the mirror portion 30 is allowed to turn relative to the first frame 40 around the X axis. Similarly, by driving the driving mechanism for turning the mirror portion 30 around the Y axis 10Y, the mirror portion 30 is allowed to turn synchronously with the first frame 40 relative to the second frame 50 around the Y axis. In other words, the micro-mirror device 100 according to the embodiment is configured to be able to turn the mirror portion 30 around both of the X and Y axes.

Hereinafter, the driving mechanism for turning the mirror portion 30 is described in detail. Each driving mechanism includes a pair of actuators (X1 and X2 for 10X, and Y1 and Y2 for 10Y). The actuators X1 and X2 are located such that both actuators face one another across the X axis and a linear segment connecting both actuators is perpendicular to the X axis. The actuators Y1 and Y2 are located such that both actuators face one another across the Y axis and a linear segment connecting both actuators is perpendicular to the Y axis. FIGS. 2 and 3 illustrate the actuator X1 which constitutes the driving mechanism for turning the mirror portion 30 around the X axis 10X. To be more concrete, FIG. 2 is a II-II section view of the actuator X1 shown in FIG. 1, and FIG. 3 is a III-III section view of the actuator X1 shown in FIGS. 1 and 2. It should be noted that all the actuators X1, X2, Y1 and Y2 have the same configuration, and accordingly, only the actuator X1 will be described for brevity.

As shown in FIG. 2, the actuator X1 is provided with a first electrode (a fixed electrode) 11 and a second electrode (a movable electrode) 12, each of which has a pair of comb electrodes. The first electrode 11 has a planar substrate 5. There are provided a first fixed comb electrode 1 on the upper surface of the planar substrate 5 and a second fixed comb electrode 2 on the lower surface thereof. The inside of the planar substrate 5 is insulated at a substantially intermediate portion between the first and second fixed comb electrodes 1 and 2, as indicated by an alternate long and short dashed line in FIG. 2, to electrically isolate the first and second fixed comb electrodes 1 and 2 from one another. To cite an example of the insulating treatment, an intermediate area between the first and second fixed comb electrodes 1 and 2 is coated with an insulating layer. Accordingly, it is possible to independently apply different voltages to the first and second fixed comb electrodes 1 and 2, respectively. The planar substrate 5 is substantially parallel to the mirror portion 30 while the mirror portion 30 is not driven. As shown in FIG. 3, the first electrode 11 is connected with a lower surface 40b of the first frame 40 through a supporting part 13 extending from the planar substrate 5 to form an L-shape.

The second electrode 12 is provided with a first movable comb electrode 3 that is formed to engage with the first fixed comb electrode 1 with a gap therebetween and a second movable comb electrode 4 that is formed to engage with the second fixed comb electrode 2 with a gap therebetween. Similar to the first electrode 11, the second electrode 12 is insulated at a substantially intermediate portion between the first and second movable comb electrodes 3 and 4. Thereby, it is possible to independently apply different voltages to the first and second movable comb electrodes 3 and 4, respectively. As shown in FIG. 2, the second electrode 12 is connected with a lower surface 30b of the mirror portion 30 through the first movable comb electrode 3. Furthermore, an intermediate portion between the first movable comb electrode 3 and the lower surface 30b of the mirror portion 30 is insulated such that voltage applied to a specific actuator can not be applied to the comb electrodes of the other actuators.

In addition, since the other actuator X2 of the driving mechanism for turning the mirror portion 30 around the X axis 10X and a pair of actuators Y1 and Y2 that constitute the driving mechanism for turning the mirror portion 30 around the Y axis 10Y have the same constitution as the above-mentioned actuator X1, explanation about the actuators X2, Y1, and Y2 is omitted here. However, it is noted that the actuators Y1 and Y2 are different from the actuators X1 and X2 with respect to that the first and second electrodes 11 and 12 are connected with the second and first frames 50 and 40, respectively.

Next, a principle for turning the mirror portion 30 around the X axis in the micro-mirror device 100 according to this embodiment will be described with reference to FIG. 4, which is a cross-section view of the micro-mirror device 100 with respect to a plane that is perpendicular to the mirror portion 30 and includes the pair of hinges 20Y. FIGS. 4A and 4B show the states of the micro-mirror device 100 before and while applying voltage to each electrode, respectively.

Figure 4A:
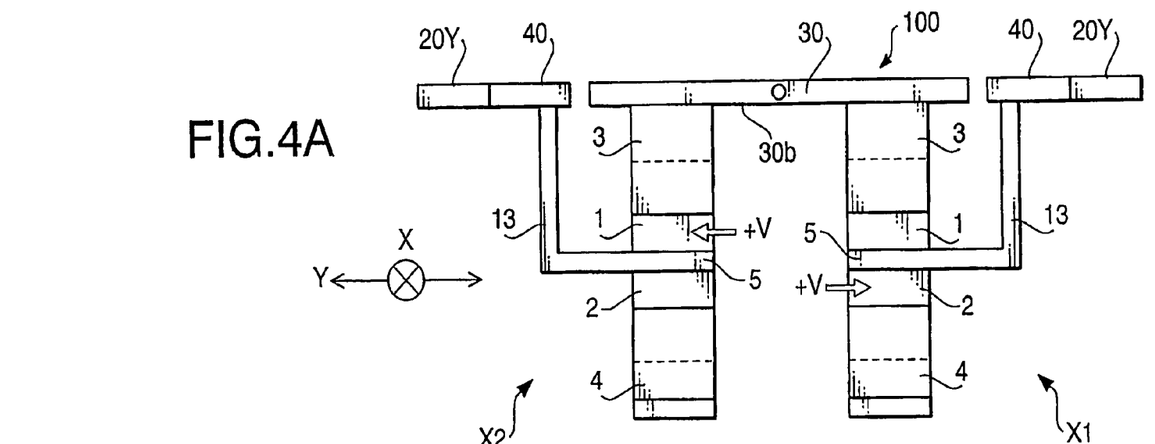
FIG. 4A schematically shows a state of the micro-mirror device 100 before applying voltage to each electrode.
Figure 4B:
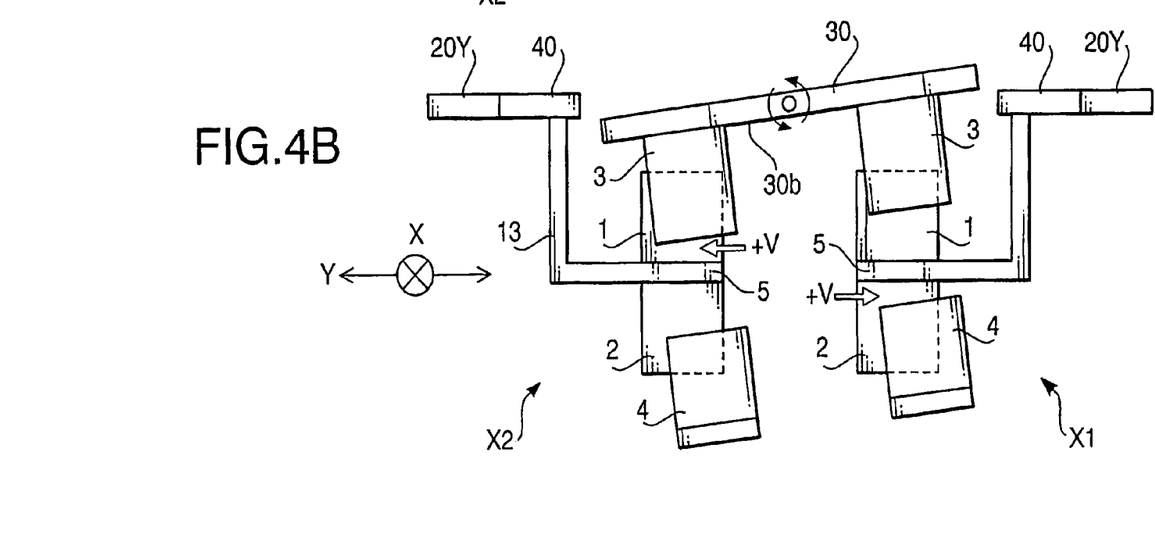
FIG. 4B schematically shows a state of the micro-mirror device 100 while applying voltage to each electrode.

In the case of turning the mirror portion 30 around the X axis, as shown in FIG. 4A, predetermined voltage (+V) is applied to the first fixed comb electrode 1 of the actuator X2 and the second fixed comb electrode 2 of the actuator X1. Thereby, the second fixed comb electrode 2 and second movable comb electrode 4 in the actuator X1 are attracted to one another by electrostatic attractive force acting therebetween. Similarly, the first fixed comb electrode 1 and the first movable comb electrode 3 in the actuator X1 are attracted to one another by electrostatic attractive force acting therebetween. Consequently, the mirror portion 30 is turned around the pair of hinges 20X shown in FIG. 1 (as indicated by black arrows in FIG. 4B). At this time, the first frame 40 is kept in a fixed state.

The above constitution of the micro-mirror device 100 and the principle for turning bring about the following effects. According to the embodiment, the electrostatic attractive force that is generated between the second fixed comb electrode 2 and the second movable comb electrode 4 in the actuator X1 lifts up the actuator X1 of the mirror portion 30. Furthermore, the electrostatic attractive force that is generated between the first fixed comb electrode 1 and the first movable comb electrode 3 in the actuator X2 pushes down the actuator X2 of the mirror portion 30. Therefore, it is allowed to apply greater moment of force with respect to the X axis to the mirror portion 30. Additionally, since the micro-mirror device 100 is configured such that voltage is applied to each electrode of the pair of the actuators X1 and X2 facing one another across the X axis (the second fixed comb electrode 2 of the actuator X1 and the first fixed comb electrode 1 of the actuator X2 in the above example), it is allowed to widen the areas of the electrodes used for generating the electrostatic attractive force. Accordingly, large tilt angle of the mirror portion 30 can be obtained as voltage applied to each of the electrodes 11 and 12 is reduced. Moreover, since the micro-mirror device 100 is configured such that the comb electrodes are provided below the mirror portion 30, or in a conventionally-existing space, it is possible to downsize the driving mechanism, and thereby the entire device. Furthermore, great moment of force that is caused by electrostatic attractive force generated at the two locations makes it possible to increase the stiffness of the hinges 20X. Therefore, according to the micro-mirror devices in this embodiment, each of the hinges 20X can be linearly-formed (as a so-called torsion bar).

In addition, in the case of turning the mirror portion 30 in a direction opposite to the above operation (FIG. 4B) around the X axis, predetermined voltage is applied to the first fixed comb electrode 1 of the actuator X1 and the second fixed comb electrode 2 of the actuator X2. In order to turn the mirror portion 30 around the Y axis, the driving mechanism for turning the mirror portion 30 around the Y axis 10Y is controlled in the same way as the above operation. However, it is noted that the second frame 50 is kept in a fixed state, and the mirror portion 30 turns synchronously with the first frame 40 while the mirror portion 30 is turned around the Y axis. In any turning operation, the same effects as described above are obtained.

Hereinbefore, the embodiment of the invention was described in detail. The invention is not limited by the embodiment. For example, a variation as mentioned below can bring about the same effects as the above embodiment.

Figure 5:
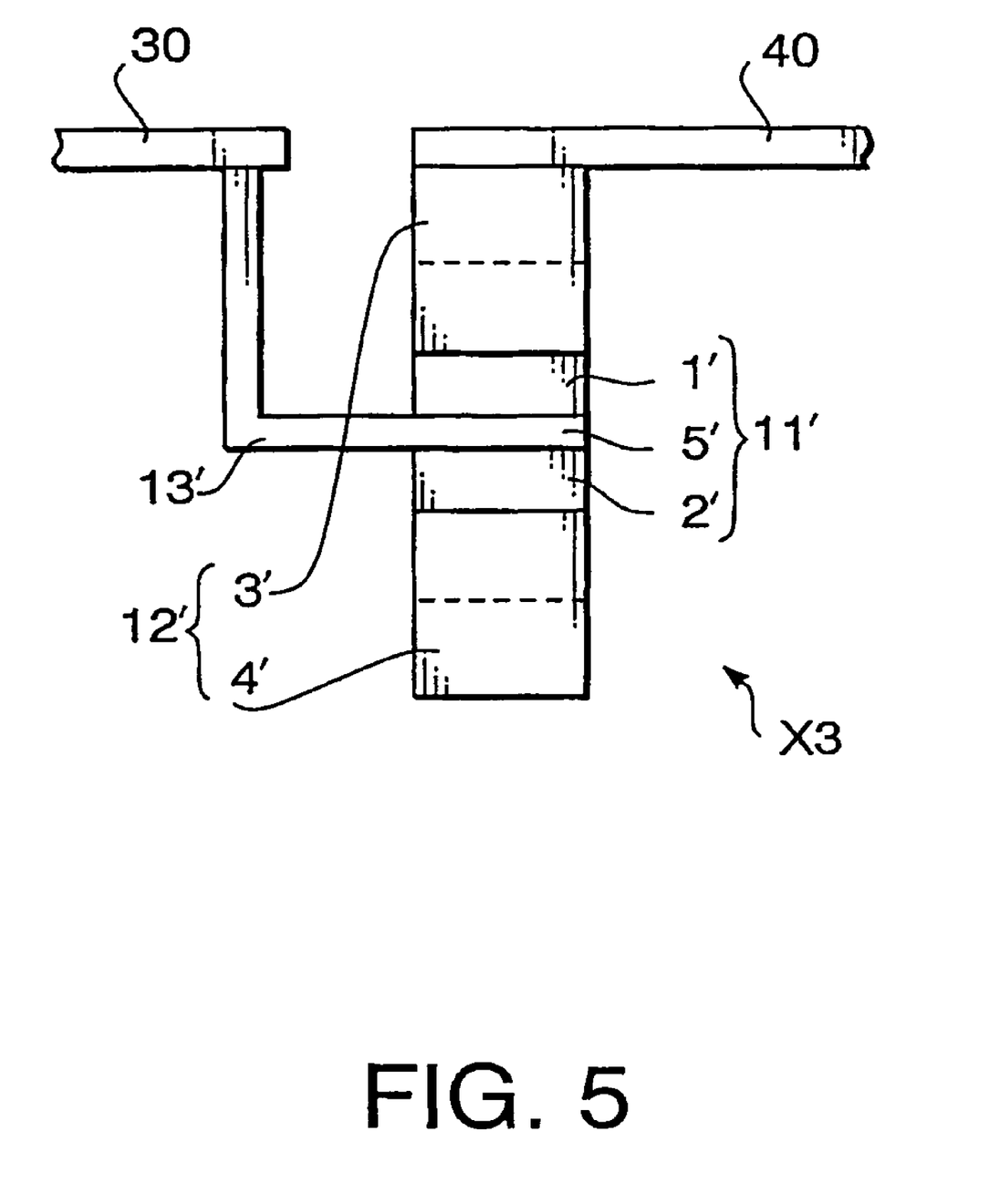
FIG. 5 schematically shows a variation example of the embodiment according to the invention.

The above-mentioned embodiment is configured such that the mirror portion 30 is turned by driving the first and second movable comb electrodes supported by the mirror portion 30 while applying voltage. On the contrary, an actuator used in the micro-mirror device and the driving mechanism according to the invention may be a variation as shown in FIG. 5. That is, the actuator X3, as shown in FIG. 5, is configured such that a first electrode 11' which is provided with first and second movable comb electrodes 1', 2', and a substrate 5' is connected with the mirror portion 30 through a supporting part 13', and a second electrode 12' which is provided with first and second fixed comb electrodes 3' and 4' is connected with the first frame 40. In the micro-mirror device employing the actuator X3, the mirror portion 30 is turned by driving the first electrode 11'.

In the above embodiment, the micro-mirror device capable of turning the mirror portion around the two axes is described as a preferable embodiment of the driving mechanism according to the invention. Even though the micro-mirror device according to the invention is a type capable of turning the mirror portion around only one axis, the same effect as the above embodiment will be obtained. Furthermore, the driving mechanism according to the invention can preferably be applied to a device provided with a turnable plane to be driven that turns around a predetermined axis, as well as the micro-mirror device.

In addition, it is noted that the actuator of the above variation can be replaced for any and any number of the actuators provided in the driving mechanism and the micro-mirror device of the embodiment.

The present disclosure relates to the subject matter contained in Japanese Patent Application No. P2004-235492, filed on Aug. 12, 2004, which is expressly incorporated herein by reference in its entirely.

What is claimed is:

1. A driving mechanism for turning a turnable plate member, with respect to a first frame member, around a predetermined first turning axis, comprising:
   a first pair of supporting members that rotatably supports the plate member with respect to the first frame member, the first pair of supporting members being aligned along the predetermined first turning axis;
   a first actuator and a second actuator provided on both sides with respect to the first turning axis and on the same surface side of the plate member,
   wherein each of the actuators includes a fixed electrode unit fixed to the first frame member and a movable electrode unit fixed to the plate member,
   the fixed electrode unit including:
   a substrate which is substantially parallel with the plate member located at a predetermined rotational position;
   a first fixed comb electrode provided on one surface side of the substrate; and
   a second fixed comb electrode provided on an opposite surface side of the substrate,
   the movable electrode unit including:
   a first movable comb electrode that engages with the first fixed comb electrode with a gap therebetween; and
   a second movable comb electrode that engages with the second fixed comb electrode with a gap therebetween,
   wherein the first fixed comb electrode and the first movable comb electrode, and the second fixed comb electrode and the second movable comb electrode are configured such that a voltage can be applied therebetween independently, and
   wherein, when the plate member is rotated, a voltage is applied one of between the first fixed comb electrode and the first movable comb electrode and between the second fixed comb electrode and the second movable comb electrode of the first actuator and the other of between the first fixed comb electrode and the first movable comb electrode and between the second fixed comb electrode and the second movable comb electrode of the second actuator.

2. The driving mechanism according to claim 1, wherein the first fixed comb electrode and the second fixed comb electrode are electrically insulated from one another.

3. The driving mechanism according to claim 1, wherein the first actuator and the second actuator are arranged along a direction substantially perpendicular to the first turning axis.

4. The driving mechanism according to claim 1, wherein an opposite surface side of the plate member to the surface side on which the first actuator and the second actuator are provided is a mirror surface.

5. The driving mechanism according to claim 1, wherein each supporting member of the first pair of supporting members is a torsion bar.

6. The driving mechanism according to claim 1, which is capable of turning the first frame member, with respect to a second frame member, around a predetermined second turning axis, the driving mechanism further comprising:
a second pair of supporting members that rotatably supports the first frame member with respect to the second frame member, the second pair of supporting members being aligned along the predetermined second turning axis; and
a third actuator and a fourth actuator provided on both sides with respect to the second turning axis and on the same side as both of the first actuator and the second actuator with respect to the plate member.

7. The driving mechanism according to claim 6, wherein the second turning axis is perpendicular to the first turning axis.

8. A driving mechanism for turning a turnable plate member, with respect to a first frame member, around a predetermined first turning axis, comprising:
a first pair of supporting members that rotatably supports the plate member with respect to the first frame member, the first pair of supporting members being aligned along the predetermined first turning axis;
a first actuator and a second actuator provided on both sides with respect to the first turning axis and on the same surface side of the plate member,
wherein each of the actuators includes a fixed electrode unit fixed to the first frame member and a movable electrode unit fixed to the plate member,
the movable electrode unit including:
a substrate which is substantially parallel with the plate member located at a predetermined rotational position;
a first movable comb electrode provided on one surface side of the substrate; and
a second movable comb electrode provided on an opposite surface side of the substrate,
the fixed electrode unit including:
a first fixed comb electrode that engages with the first movable comb electrode with a gap therebetween; and
a second fixed comb electrode that engages with the second movable comb electrode with a gap therebetween,
wherein the first fixed comb electrode and the first movable comb electrode, and the second fixed comb electrode and the second movable comb electrode are configured such that a voltage can be applied therebetween independently, and
wherein, when the plate member is rotated, a voltage is applied one of between the first fixed comb electrode and the first movable comb electrode and between the second fixed comb electrode and the second movable comb electrode of the first actuator and the other of between the first fixed comb electrode and the first movable comb electrode and between the second fixed comb electrode and the second movable comb electrode of the second actuator.

9. The driving mechanism according to claim 8, wherein the first movable comb electrode and the second movable comb electrode are electrically insulated from one another.

10. The driving mechanism according to claim 8, wherein the first actuator and the second actuator are arranged along a direction substantially perpendicular to the first turning axis.

11. The driving mechanism according to claim 8, wherein an opposite surface side of the plate member to the surface side on which the first actuator and the second actuator are provided is a mirror surface.

12. The driving mechanism according to claim 8, wherein each supporting member of the first pair of supporting members is a torsion bar.

13. The driving mechanism according to claim 8, which is capable of turning the first frame member, with respect to a second frame member, around a predetermined second turning axis, the driving mechanism further comprising:
a second pair of supporting members that rotatably supports the first frame member with respect to the second frame member, the second pair of supporting members being aligned along the predetermined second turning axis; and
a third actuator and a fourth actuator provided on both sides with respect to the second turning axis and on the same side as both of the first actuator and the second actuator with respect to the plate member.

14. The driving mechanism according to claim 13, wherein the second turning axis is substantially perpendicular to the first turning axis.

15. A driving mechanism for turning a turnable plate member, with respect to a first frame member around a predetermined first turning axis, with respect to a second frame member around a predetermined second turning axis, comprising:
a first pair of supporting members that rotatably supports the plate member with respect to the first frame member, the first pair of supporting members being aligned along the predetermined first turning axis;
a second pair of supporting members that rotatably supports the first frame member with respect to the second frame member, the second pair of supporting members being aligned along the predetermined second turning axis;
a first actuator and a second actuator provided on both sides with respect to the first turning axis and on the same surface side of the plate member, each of the first actuator and the second actuator including a first fixed electrode unit fixed to the first frame member and a first movable electrode unit fixed to the plate member;
a third actuator and a fourth actuator provided on both sides with respect to the second turning axis and on the same side as both of the first actuator and the second actuator with respect to the plate member, each of the third actuator and the fourth actuator including a second fixed electrode unit fixed to the second frame member and a second movable electrode unit fixed to the first frame member,
wherein each of the first fixed electrode unit and the second fixed electrode unit includes:
a substrate which is substantially parallel with the plate member located at a predetermined rotational position;
a first fixed comb electrode provided on one surface side of the substrate; and
a second fixed comb electrode provided on an opposite surface side of the substrate,
wherein each of the first movable electrode unit and the second movable electrode unit includes:
a first movable comb electrode that engages with the first fixed comb electrode with a gap therebetween; and
a second movable comb electrode that engages with the second fixed comb electrode with a gap therebetween,
wherein the first fixed comb electrode and the first movable comb electrode, and the second fixed comb electrode and the second movable comb electrode are configured such that a voltage can be applied therebetween independently, wherein, when the plate member is rotated around the first turning axis, a voltage is applied one of between the first fixed comb electrode and the first movable comb electrode and between the second fixed comb electrode and the second movable comb electrode of the first actuator and the other of between the first fixed comb electrode and the first movable comb electrode and between the second fixed comb electrode and the second movable comb electrode of the second actuator, and wherein, when the plate member is rotated around the second turning axis, a voltage is applied one of between the first fixed comb electrode and the first movable comb electrode and between the second fixed comb electrode and the second movable comb electrode of the third actuator and the other of between the first fixed comb electrode and the first movable comb electrode and between the second fixed comb electrode and the second movable comb electrode of the fourth actuator.

16. The driving mechanism according to claim 15, wherein the first fixed comb electrode and the second fixed comb electrode are electrically insulated from one another.

17. The driving mechanism according to claim 15, wherein the first actuator and the second actuator are arranged along a direction substantially perpendicular to the first turning axis.

18. The driving mechanism according to claim 15, wherein the second turning axis is substantially perpendicular to the first turning axis.

19. A driving mechanism for turning a turnable plate member, with respect to a first frame member around a predetermined first turning axis, with respect to a second frame member around a predetermined second turning axis, comprising:

a first pair of supporting members that rotatably supports the plate member with respect to the first frame member, the first pair of supporting members being aligned along the predetermined first turning axis;

a second pair of supporting members that rotatably supports the first frame member with respect to the second frame member, the second pair of supporting members being aligned along the predetermined second turning axis;

a first actuator and a second actuator provided on both sides with respect to the first turning axis and on the same surface side of the plate member, each of the first actuator and the second actuator including a first fixed electrode unit fixed to the first frame member and a first movable electrode unit fixed to the plate member;

a third actuator and a fourth actuator provided on both sides with respect to the second turning axis and on the same side as both of the first actuator and the second actuator with respect to the plate member, each of the third actuator and the fourth actuator including a second fixed electrode unit fixed to the second frame member and a second movable electrode unit fixed to the first frame member, wherein each of the first movable electrode unit and the second movable electrode unit includes:

a substrate which is substantially parallel with the plate member located at a predetermined rotational position;

a first movable comb electrode provided on one surface side of the substrate; and a second movable comb electrode provided on an opposite surface side of the substrate, wherein each of the first fixed electrode unit and the second fixed electrode unit includes:

a first fixed comb electrode that engages with the first movable comb electrode with a gap therebetween; and a second fixed comb electrode that engages with the second movable comb electrode with a gap therebetween, wherein the first fixed comb electrode and the first movable comb electrode, and the second fixed comb electrode and the second movable comb electrode are configured such that a voltage can be applied therebetween independently, wherein, when the plate member is rotated around the first turning axis, a voltage is applied one of between the first fixed comb electrode and the first movable comb electrode and between the second fixed comb electrode and the second movable comb electrode of the first actuator and the other of between the first fixed comb electrode and the first movable comb electrode and between the second fixed comb electrode and the second movable comb electrode of the second actuator, and wherein, when the plate member is rotated around the second turning axis, a voltage is applied one of between the first fixed comb electrode and the first movable comb electrode and between the second fixed comb electrode and the second movable comb electrode of the third actuator and the other of between the first fixed comb electrode and the first movable comb electrode and between the second fixed comb electrode and the second movable comb electrode of the fourth actuator.

20. The driving mechanism according to claim 19, wherein the first movable comb electrode and the second movable comb electrode are electrically insulated from one another.

* * * * *